US012325145B2

(12) United States Patent
Kim et al.

(10) Patent No.: US 12,325,145 B2
(45) Date of Patent: Jun. 10, 2025

(54) RAZOR CARTRIDGE

(71) Applicant: DORCO CO., LTD., Gyeonggi-do (KR)

(72) Inventors: Dong Il Kim, Seoul (KR); Se Jun Jang, Seoul (KR); Eun Hye Jo, Seoul (KR); Na Yeon Yoo, Seoul (KR)

(73) Assignee: DORCO CO., LTD., Yongin-si (KR)

(*) Notice: Subject to any disclaimer, the term of this patent is extended or adjusted under 35 U.S.C. 154(b) by 175 days.

(21) Appl. No.: 18/000,006

(22) PCT Filed: May 21, 2021

(86) PCT No.: PCT/KR2021/006368
§ 371 (c)(1),
(2) Date: Nov. 28, 2022

(87) PCT Pub. No.: WO2021/241945
PCT Pub. Date: Dec. 2, 2021

(65) Prior Publication Data

US 2023/0202065 A1 Jun. 29, 2023

(30) Foreign Application Priority Data

May 26, 2020 (KR) ........................ 10-2020-0063184

(51) Int. Cl.
*B26B 21/52* (2006.01)
*B26B 21/22* (2006.01)
*B26B 21/40* (2006.01)

(52) U.S. Cl.
CPC .......... *B26B 21/521* (2013.01); *B26B 21/225* (2013.01); *B26B 21/4018* (2013.01); *B26B 21/4043* (2013.01); *B26B 21/4068* (2013.01)

(58) Field of Classification Search
CPC . B26B 21/521; B26B 21/225; B26B 21/4018; B26B 21/4043; B26B 21/4068
See application file for complete search history.

(56) References Cited

U.S. PATENT DOCUMENTS 9,925,675 B2 * 3/2018 Molema ................ B26B 19/386
9,987,759 B2 * 6/2018 Molema ................ B26B 19/042
(Continued)

FOREIGN PATENT DOCUMENTS

KR 101578263 12/2015
KR 101795475 11/2017
(Continued)

OTHER PUBLICATIONS

PCT International Application No. PCT/KR2021/006368, International Search Report dated Sep. 1, 2021, 3 pages.

*Primary Examiner* — Omar Flores Sanchez
(74) *Attorney, Agent, or Firm* — Knobbe, Martens, Olson & Bear, LLP

(57) ABSTRACT

A razor cartridge is disclosed herein. An embodiment of the present disclosure provides a razor cartridge configured to be coupled to a razor handle and used, the razor cartridge including: at least one shaving blade having a cutting edge; a blade housing configured to accommodate the at least one shaving blade so that the at least one shaving blade is placed in a longitudinal direction, the blade housing including a top side to which the cutting edge is directed and a bottom side facing the top side; a support structure coupled to one side of the blade housing; and at least one first living hinge configured to connect at least a portion of the blade housing to at least a portion of the support structure.

15 Claims, 16 Drawing Sheets

(56) References Cited

U.S. PATENT DOCUMENTS

| | | | | |
|---|---|---|---|---|
| 2003/0204954 | A1* | 11/2003 | Wain | B26B 21/4068 30/346.5 |
| 2009/0288299 | A1* | 11/2009 | Denkert | B26B 21/225 30/50 |
| 2010/0043242 | A1* | 2/2010 | Stevens | B26B 21/521 30/527 |
| 2010/0101092 | A1* | 4/2010 | Wain | B26B 21/4068 30/57 |
| 2010/0205808 | A1* | 8/2010 | King | B26B 21/225 30/34.2 |
| 2010/0269352 | A1* | 10/2010 | Curtin | B26B 21/521 30/123.5 |
| 2014/0068953 | A1* | 3/2014 | Wonderley | B26B 21/521 30/527 |
| 2016/0271815 | A1* | 9/2016 | Molema | B26B 19/042 |
| 2017/0021513 | A1 | 1/2017 | Liberatore | |
| 2017/0326741 | A1* | 11/2017 | Liberatore | B26B 21/565 |
| 2017/0326744 | A1 | 11/2017 | Liberatore | |
| 2018/0326606 | A1 | 11/2018 | Liberatore | |
| 2019/0202076 | A1 | 7/2019 | Park et al. | |
| 2019/0299439 | A1 | 10/2019 | Park et al. | |
| 2020/0290226 | A1* | 9/2020 | Lucchese | B26B 21/521 |

FOREIGN PATENT DOCUMENTS

| | | |
|---|---|---|
| KR | 1020180003529 | 1/2018 |
| KR | 101876232 | 7/2018 |

* cited by examiner

RAZOR CARTRIDGE

CROSS-REFERENCE TO RELATED APPLICATION(S)

This application is the National Stage filing under 35 U.S.C. 371 of International Application No. PCT/KR2021/006368, filed on May 21, 2021, which claims the benefit of earlier filing date and right of priority to Korean Application No. 10-2020-0063184, filed on May 26, 2020, the contents of which are all incorporated by reference herein in their entirety.

TECHNICAL FIELD

The present disclosure relates to a razor cartridge.

BACKGROUND ART

The content described in the present paragraph merely provides background information of the present disclosure and does not constitute the related art.

Generally, a wet razor is composed of a razor cartridge and a razor handle. The razor cartridge includes a shaving blade and a blade housing that houses the shaving blade.

Recently, a wet razor with a pivoting function (hereinafter referred to as a pivoting razor) has appeared in order to provide a user with an improved shaving feeling. In such a pivoting razor, a razor cartridge includes a connector configured to connect to a razor handle.

The connector may be pivotably connected to a blade housing or the razor handle, thereby providing a pivoting function to the pivoting razor.

Meanwhile, a connector of the related art is configured as a member separate from the blade housing. Therefore, the connector of the related art is generally used with the connector mounted on or connected to a bottom side of the blade housing.

The connector and the blade housing of the related art can be easily separated from each other when an external impact is applied to the razor cartridge. In fact, it is known that when the razor drops onto the ground, the connector is often separated from the blade housing. In this case, there is a problem in that the razor cartridge should be replaced with a new razor cartridge because it is difficult to reassemble the connector with the blade housing.

Furthermore, because the connector of the related art is a member separate from the blade housing, it is necessary for the connector to be firmly coupled to the blade housing. To this end, the connector of the related art may be designed to be coupled to the blade housing at more points or over a larger area. This causes a problem in that an assembly process is complicated and a size of the connector is increased.

Meanwhile, there is a problem in that the productivity of the razor cartridge is lowered because the connector of the related art is manufactured separately from the blade housing.

SUMMARY

Therefore, a main object of the present disclosure is to improve the durability of a razor cartridge and simplify a structure and an assembly process of the razor cartridge by connecting a blade housing to other members coupled to the blade housing such as a connector through a living hinge.

Furthermore, a main object of the present disclosure is to improve the productivity of a razor cartridge by integrally manufacturing a blade housing and a component coupled to the blade housing such as a connector.

An embodiment of the present disclosure provides a razor cartridge configured to be coupled to a razor handle and used, the razor cartridge including: at least one shaving blade having a cutting edge; a blade housing configured to accommodate the at least one shaving blade so that the at least one shaving blade is placed in a longitudinal direction, the blade housing including a top side to which the cutting edge is directed and a bottom side facing the top side; a support structure coupled to one side of the blade housing; and at least one first living hinge configured to connect at least a portion of the blade housing to at least a portion of the support structure.

As described above, according to the embodiment, there is an effect that durability of the razor cartridge is improved and a structure and an assembly process of the razor cartridge are simplified by connecting the blade housing to the connector or the like, through a living hinge.

There is another effect that the productivity of the razor cartridge is improved by integrally forming the blade housing and other members such as the connector.

REFERENCE NUMERALS

Figure 1A:
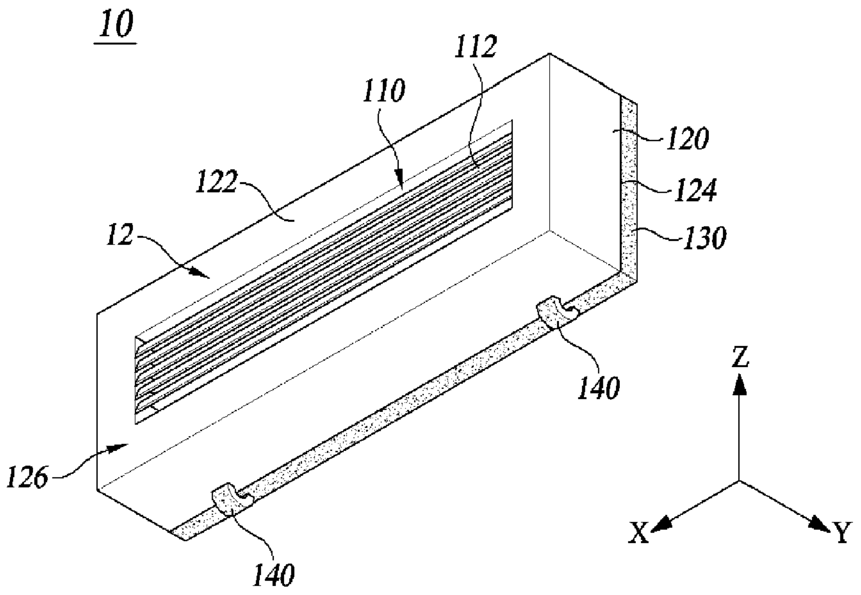
FIG. 1 is a perspective view of a razor cartridge according to an embodiment of the present disclosure.

10: razor cartridge
110: shaving blade
120: blade housing
122: top side
124: bottom side

126: guard portion
130: support structure
140: first living hinge
231: connector
260: rubber member
270: trimming blade
332: bottom side frame
480: second living hinge
534: top side frame

DETAILED DESCRIPTION

Hereinafter, some exemplary embodiments of the present disclosure will be described in detail with reference to the accompanying drawings. In the following description, like reference numerals preferably designate like elements, although the elements are shown in different drawings. Furthermore, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary.

FIG. 1 is a perspective view of a razor cartridge 10 according to an embodiment of the present disclosure.

Figure 1B:
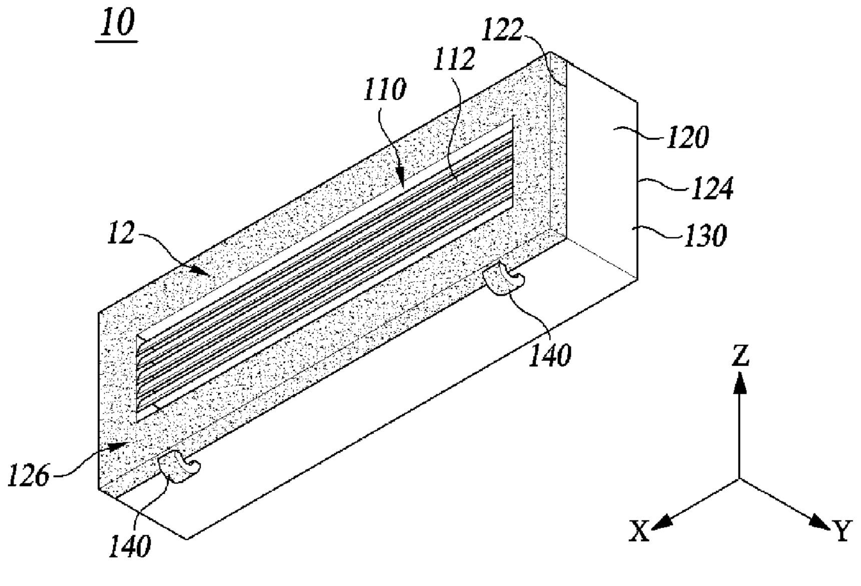

Specifically, FIG. 1A illustrates a case in which a support structure 130 of the razor cartridge 10 according to an embodiment of the present disclosure is coupled to a bottom side 124 of a blade housing 120, and FIG. 1B illustrates a case in which the support structure 130 of the razor cartridge 10 according to the embodiment of the present disclosure is coupled to a top side 122 of the blade housing 120.

Referring to FIGS. 1A and B, the razor cartridge 10 includes a shaving blade 110, a blade housing 120, a support structure 130, and first living hinge 140.

The blade housing 120 may accommodate at least one shaving blade 110 having a cutting edge 112 so that the shaving blade 110 is placed in a longitudinal direction. Here, the longitudinal direction refers to a width direction of the blade housing 120. For example, in FIG. 1, the longitudinal direction is a direction parallel to an X axis.

The at least one shaving blade 110, in a state in which it is accommodated in the blade housing 120, may be supported by a plurality of clips (not illustrated).

The at least one shaving blade 110 may be a bended blade or a welded blade. However, the present disclosure is not limited thereto, and the at least one shaving blade may be a straight blade.

The blade housing 120 may include the top side 122 and the bottom side 124. The top side 122 may be a side of the blade housing 120 to which the cutting edge 112 is directed. The bottom side 124 may be a side of the blade housing 120 that faces the top side 122.

The blade housing 120 may include a guard portion 126 and a cap portion 12.

The guard portion 126 may be disposed in front of the at least one shaving blade 110 on the top side 122 of the blade housing 120.

Here, the front and rear of the shaving blade 110 are defined with respect to a shaving direction of the razor cartridge 10. Accordingly, in FIG. 1, the front and rear of the shaving blade 110 are in a negative Z-axis direction and a positive Z-axis direction with respect to the shaving blade 110, respectively.

The guard portion 126, at the time of shaving, may stretch skin in the shaving direction before hair is cut by the shaving blade 110. This makes it possible for hair of a user to stand in a direction perpendicular to a skin contact surface, and thus, it is possible for the shaving blade 110 to more easily cut the hair.

The cap portion 12 may be disposed behind the at least one shaving blade 110 on the top side 122 of the blade housing 120.

The support structure 130 may be coupled to one side of the blade housing 120. For example, the support structure 130 may be coupled to the top side 122 or the bottom side 124 of the blade housing 120. However, the present disclosure is not limited thereto. For example, the support structure 130 may be coupled to both the top side 122 and the bottom side 124.

The support structure 130 may include at least one of a connector, a bottom side frame, and a top side frame. However, the present disclosure is not limited thereto, and the support structure may include other components coupled to the blade housing.

At least one first living hinge 140 may connect at least a portion of the blade housing 120 to at least a portion of the support structure 130. Here, the living hinge is a hinge that connects two members, and refers to a hinge made of the same material as the two members.

Accordingly, at least part of the blade housing 120, at least part of the support structure 130 and the at least one first living hinge 140 may be made of the same material, such as a plastic material.

Furthermore, the at least portion of the blade housing 120, the at least portion of the support structure 130, and the at least one first living hinge 140 may be integrally formed. In this case, the support structure 130 and the first living hinge 140 may be formed by injection in the blade housing 120. However, the present disclosure is not limited thereto, and the support structure 130 and the first living hinge 140 may be formed through a method other than double injection.

The razor cartridge 10 according to the embodiment of the present disclosure, by integrally forming at least a portion of the blade housing 120 and at least a portion of another member coupled to the blade housing 120, such as the support structure 130, can have higher productivity than a production method of the related art in which each member is separately manufactured.

The first living hinge 140 may be disposed adjacent to the guard portion 126. In this case, the first living hinge 140 may connect one end of the blade housing 120 adjacent to the guard portion 126 and one side of the support structure 130 corresponding thereto.

However, the present disclosure is not limited thereto, and the first living hinge 140 may be disposed to be spaced apart from the guard portion 126, or disposed adjacent to both ends of the blade housing 120 in the longitudinal direction.

FIG. 2 is a side cross-sectional view of the razor cartridge 10 according to the embodiment of the present disclosure.

Figure 2A:
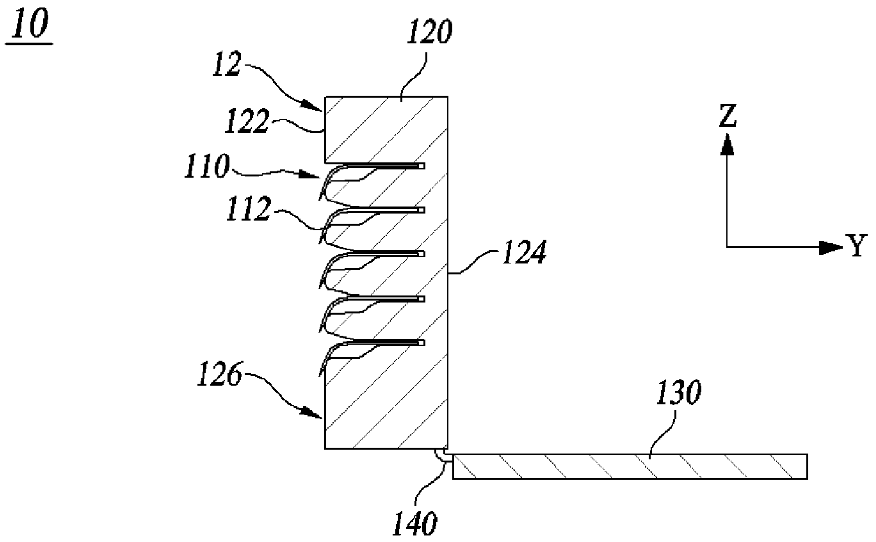
FIG. 2 is a side cross-sectional view of the razor cartridge according to the embodiment of the present disclosure.
Figure 2B:
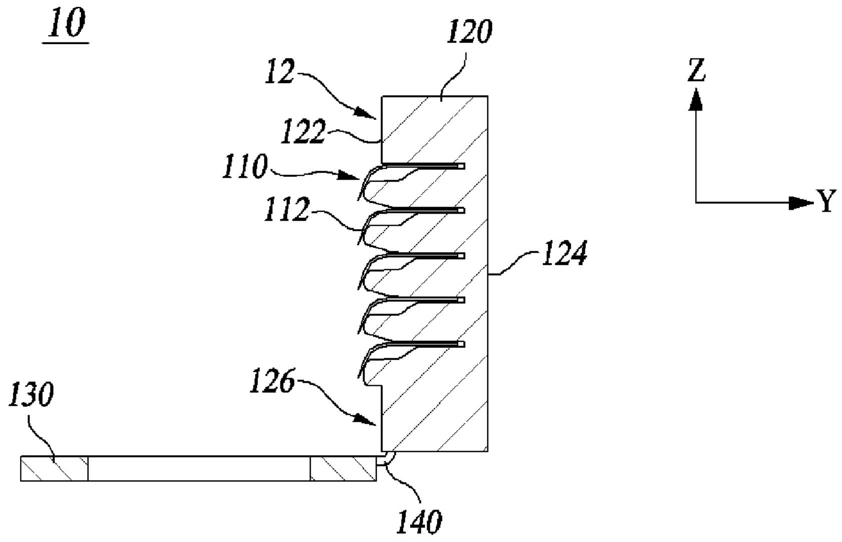

Specifically, FIG. 2A illustrates a side cross-sectional view of the razor cartridge 10 illustrated in FIG. 1A, and FIG. 2B is a side cross-sectional view of the razor cartridge 10 illustrated in FIG. 1B.

Referring to FIGS. 2A and B, in a non-assembled state, the at least portion of the blade housing 120 and the at least portion of the support structure 130 may be in a state in which these are connected by the at least one first living hinge (140).

In an assembled state, each support structure 130 may move toward the top side 122 or the bottom side 124 of the blade housing 120 by the first living hinge 140 being folded.

In this case, the other side of the support structure 130 may be connected to the blade housing 120. The other side of the support structure 130 may be connected to the blade housing 120 in a variety of ways, such as hanging coupling such as hook coupling or snap-fit, fitting coupling such as fitting, adhesive coupling using an adhesive or the like, or a combination thereof.

Hereinafter, repeated description of components substantially the same as those described above will be omitted.

Figure 3:
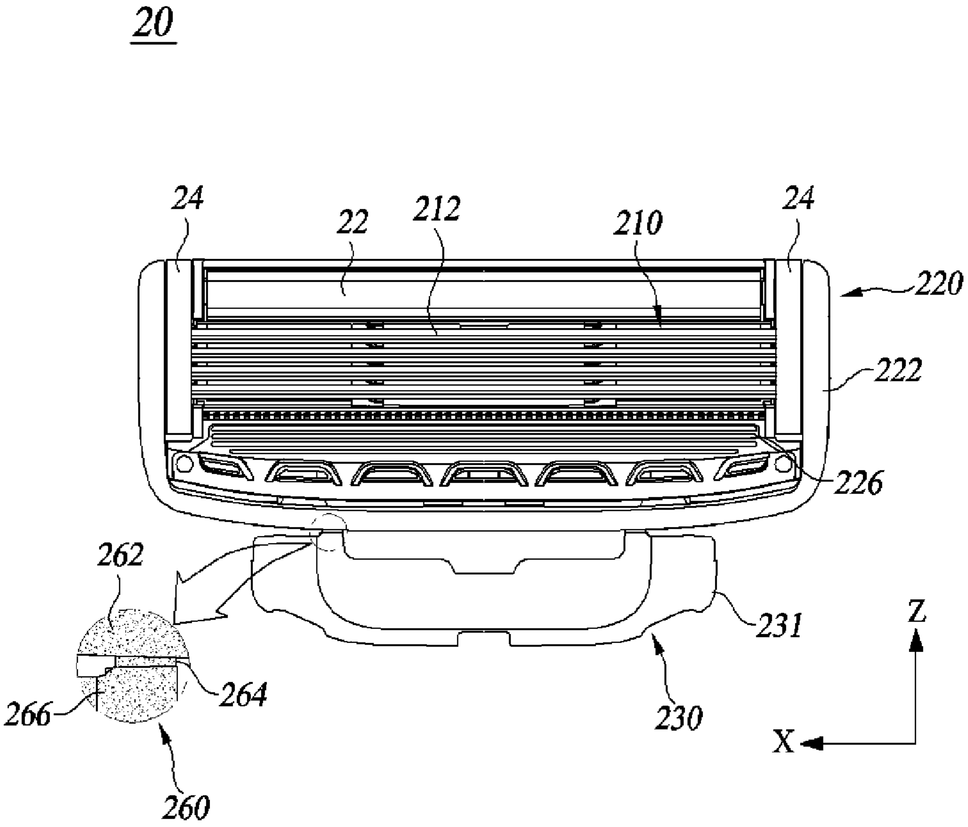
FIGS. 3 and 4 illustrate a deployed state of a razor cartridge according to a second embodiment of the present disclosure.
Figure 4:
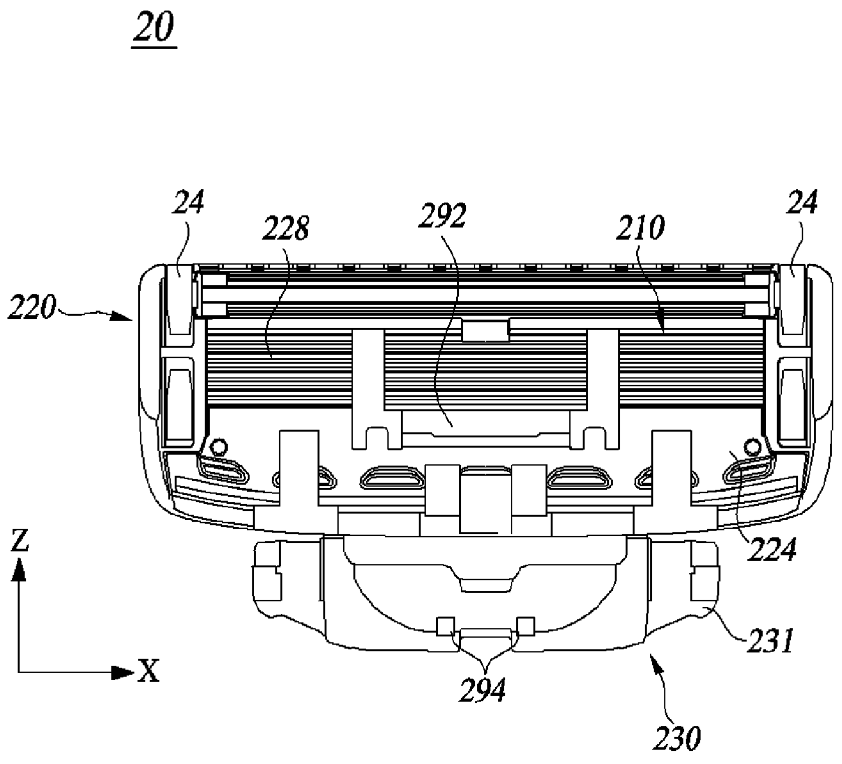

FIGS. 3 and 4 illustrate a deployed state of a razor cartridge 20 according to a second embodiment of the present disclosure.

Referring to FIGS. 3 and 4, the razor cartridge 20 may include a shaving blade 210, a blade housing 220, a support structure 230, at least one first living hinge 240, and a trimming blade 270.

The blade housing 220 may accommodate at least one shaving blade 210 having a cutting edge 212 so that the at least one shaving blade 210 is placed in a longitudinal direction.

The blade housing 220 may include a top side 222 and a bottom side 224. The top side 222 may be a side of the blade housing 220 to which the cutting edge 212 is directed. The bottom side 224 may be a side of the blade housing 220 that faces the top side 222.

The blade housing 220 may include a guard portion 226, a cap portion 22, and a rinsing hole 228.

The rinsing hole 228 may be formed in the bottom side 224 of the blade housing 220. The user may remove debris accumulated in the shaving blade 210 by passing water through the rinsing hole 228.

The support structure 230 may be coupled to one side of the blade housing 220. For example, the support structure 230 may be coupled to the bottom side 224 of the blade housing 220.

The support structure 230 according to the second embodiment of the present disclosure may include a connector 231. The connector 231 may be disposed on the bottom side 224 of the blade housing 220, and may be coupled to at least a portion of the bottom side 224.

The connector 231 may be configured to be connected to a razor handle (not illustrated). For example, the connector 231 may be pivotably connected to the razor handle. However, the present disclosure is not limited thereto, and the connector 231 may be connected to the razor handle so that a position of the connector 231 is fixed with respect to the razor handle.

The at least one first living hinge 240 may connect at least a portion of the blade housing 220 to at least a portion of the connector 231.

The at least portion of the blade housing 220, the at least portion of the connector 231, and the at least one first living hinge 240 may be made of the same material, such as a plastic material.

Furthermore, the at least portion of the blade housing 220, the at least portion of the connector 231, and the at least one first living hinge 240 may be integrally formed.

The first living hinge 240 may be disposed adjacent to the guard portion 226. In this case, the first living hinge 240 may connect one end of the blade housing 220 adjacent to the guard portion 226 and one side of the connector 231 corresponding thereto.

However, the present disclosure is not limited thereto, and the first living hinge 240 may be disposed to be spaced apart from the guard portion 226, or disposed adjacent to both ends of the blade housing 220 in the longitudinal direction.

The trimming blade 270 may be disposed behind the at least one shaving blade 210 on the bottom side 224 of the blade housing 220.

The trimming blade 270 may include a trimming edge 272. The trimming edge 272 may cut hair of the user at the time of trimming shaving.

A direction in which the trimming edge 272 is directed may be opposite to a direction in which the cutting edge 212 of the shaving blade 210 is directed.

The razor cartridge 20 may additionally include protrusions 292 and hooks 294.

The protrusion 292 may be formed on the bottom side 224 of the blade housing 220, and the hook 294 may be formed in the support structure 230, for example, the connector 231.

The protrusion 292 and the hook 294 may be hook coupled so that the blade housing 220 and the connector 231 may be connected to each other.

Specifically, the one side of the connector 231 may be connected to the blade housing 220 by the first living hinge 240, and the other side of the connector 231 may be connected to the blade housing 220 through hook coupling between the hook 294 and the protrusion 292.

In this case, the one side of the connector 231 may be an area of the connector 231 adjacent to the one end of the blade housing 220 adjacent to the guard portion 226, and the other side of the connector 231 may be an area of the connector 231 spaced apart from the one end of the blade housing 220.

Thus, the blade housing 220 and the support structure 230, for example, the connector 231, may be connected at a position spaced apart from the at least one first living hinge 240 through the hook coupling between the protrusion 292 and the hook 294.

Meanwhile, because the first living hinge 240 is disposed adjacent to the guard portion 226, the connector 231 may be disposed relatively adjacent to the one end of the blade housing 220 adjacent to the guard portion 226.

This makes it possible to minimize an area of the rinsing hole 228 that is covered by the connector 231. That is, it is possible to maximize an area of the rinsing hole 228 exposed to the outside. Thus, a larger amount of water can pass through the rinsing hole 228 at the time of washing the razor cartridge 20, and it is possible to perform the washing of the razor cartridge 20 more effectively.

Furthermore, because the first living hinge 240 is disposed adjacent to the guard portion 226, the hook coupling between the protrusion 292 and the hook 294 may also be made relatively adjacent to the one end of the blade housing 220.

Because the coupling between the connector 231 and the blade housing 220 is made through the connection using the first living hinge 240 and the hook coupling between the protrusion 292 and the hook 294, a size of the connector 231 required for the connector 231 to be mounted on the blade housing 220 may be reduced. That is, an overall size of the connector 231 may be reduced.

The protrusion 292 is formed in the blade housing 220 and the hook 294 is formed in the support structure 230 as illustrated in FIGS. 3 and 4, but the present disclosure is not limited thereto. For example, the protrusion 292 may be formed in the support structure 230 and the hook 294 may be formed in the blade housing 220.

Furthermore, a case in which the other side of the connector 231 is connected to the blade housing 220 through the hook coupling is illustrated in FIGS. 3 and 4, but the present disclosure is not limited thereto. Accordingly, the other side of the connector 231 may be connected to the blade housing 220 in a variety of ways, such as hanging coupling such as hook coupling or snap-fit, fitting coupling such as fitting, adhesive coupling using an adhesive or the like, or a combination thereof.

Optionally, the razor cartridge 20 may include a rubber member 260.

The rubber member 260 may fully or partially cover a connection area between the blade housing 220 and the first living hinge 240, and a connection area between the first living hinge 240 and the connector 231.

Therefore, there is an effect that the razor cartridge 20 according to the third embodiment of the present disclosure may provide a soft feeling of contact to the user through the rubber member 260 even when the razor cartridge 20 comes into contact with the skin of the user at the time of shaving.

The rubber member 260 may include a first rubber area 262, a second rubber area 264, and a third rubber area 266.

The first rubber area 262 may cover the at least portion of the blade housing 220, and the second rubber area 264 may cover one side of the at least one first living hinge 240. Furthermore, the third rubber area 266 may cover at least a portion of the support structure 230, for example, at least a portion of the connector 231.

The first rubber area 262, the second rubber area 264, and the third rubber area 266 may be integrally formed. Thus, the connection between the blade housing 220 and the connector 231 using the first living hinge 240 may be more firmly made.

For example, even when the first living hinge 240 is broken, a connected state between the at least portion of the blade housing 220 and the at least portion of the connector 231 may be maintained as it is by the rubber member 260.

The rubber member 260 may be formed by double injection on the at least portion of the blade housing 220, the at least portion of the connector 231, and the at least one first living hinge 240. However, the present disclosure is not limited thereto.

For example, the rubber member 260 may be separately manufactured and then attached to the blade housing 220, the connector 231, or the first living hinge 240 through an adhesive or the like.

FIG. 5 illustrates a process in which the razor cartridge 20 according to the second embodiment of the present disclosure is assembled.

Figure 5A:
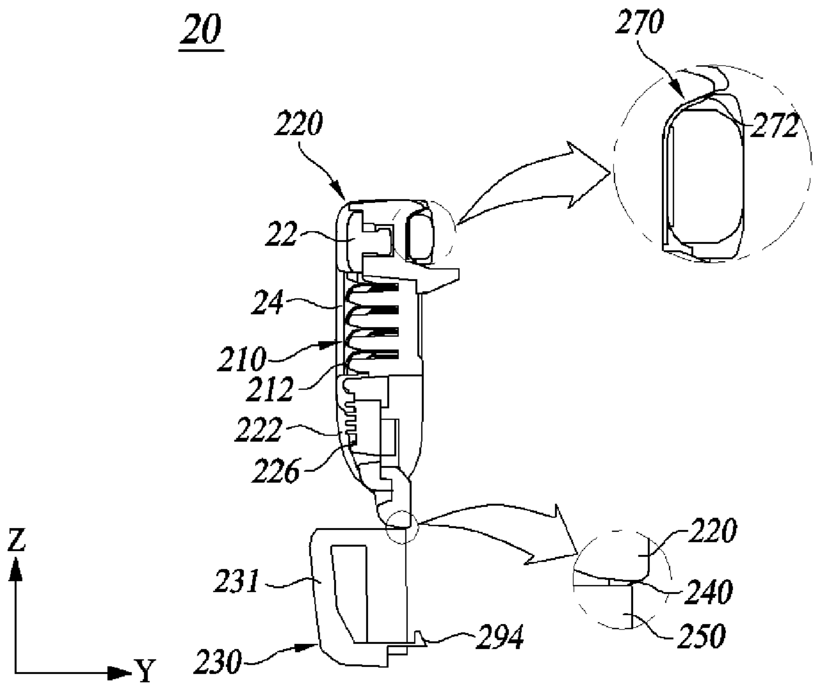
FIG. 5 is a view illustrating a process in which the razor cartridge according to the second embodiment of the present disclosure is assembled.
Figure 5B:
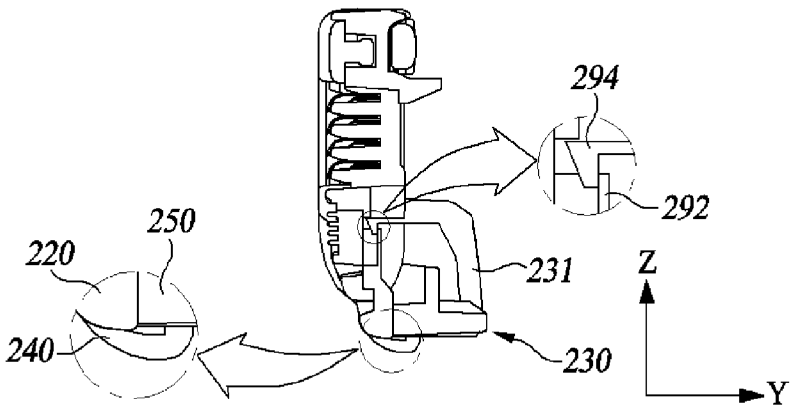

Specifically, FIG. 5A illustrates a side cross-sectional view of the razor cartridge 20 before assembly, and FIG. 5B illustrates a side cross-sectional view of the razor cartridge 20 after assembly.

Referring to FIG. 5A, the hook coupling between the protrusion 292 and the hook 294 may be in a released state in a non-assembled state. Accordingly, the other side of the connector 231 in which the hook 294 is formed may be in a state separated from the blade housing 220.

Meanwhile, the at least portion of the blade housing 220 and the at least portion of the connector 231 may be connected by the at least one first living hinge 240 in the non-assembled state.

Referring to FIG. 5B, in a state after assembly, the connector 231 may move toward the bottom side 324 of the blade housing 320 by the first living hinge 340 being folded.

In this case, the hook coupling may be made between the protrusion 292 and the hook 294, and the other side of the connector 231 in which the hook 294 is formed may be connected to the blade housing 220.

Meanwhile, when the hook coupling is made between the protrusion 292 and the hook 294, tensile stress may be generated inside the first living hinge 240. In this case, the hook 294 may be pulled toward the first living hinge 240, and the hook coupling between the protrusion 292 and the hook 294 may be made stronger. Thus, the blade housing 220 and the connector 231 may be more firmly coupled.

Hereinafter, repeated description of components substantially the same as those described above will be omitted.

Figure 6:
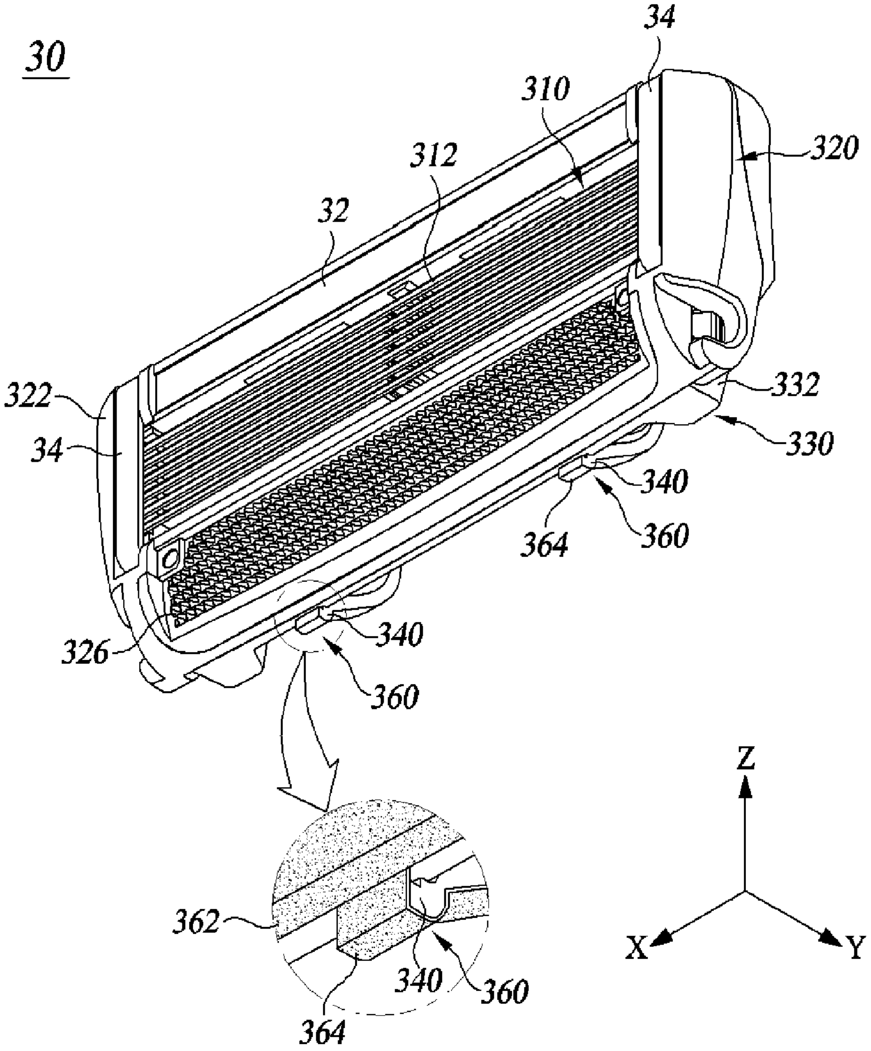
FIG. 6 is a perspective view of a razor cartridge according to a third embodiment of the present disclosure.

FIG. 6 is a perspective view of a razor cartridge 30 according to the third embodiment of the present disclosure.

Figure 7:
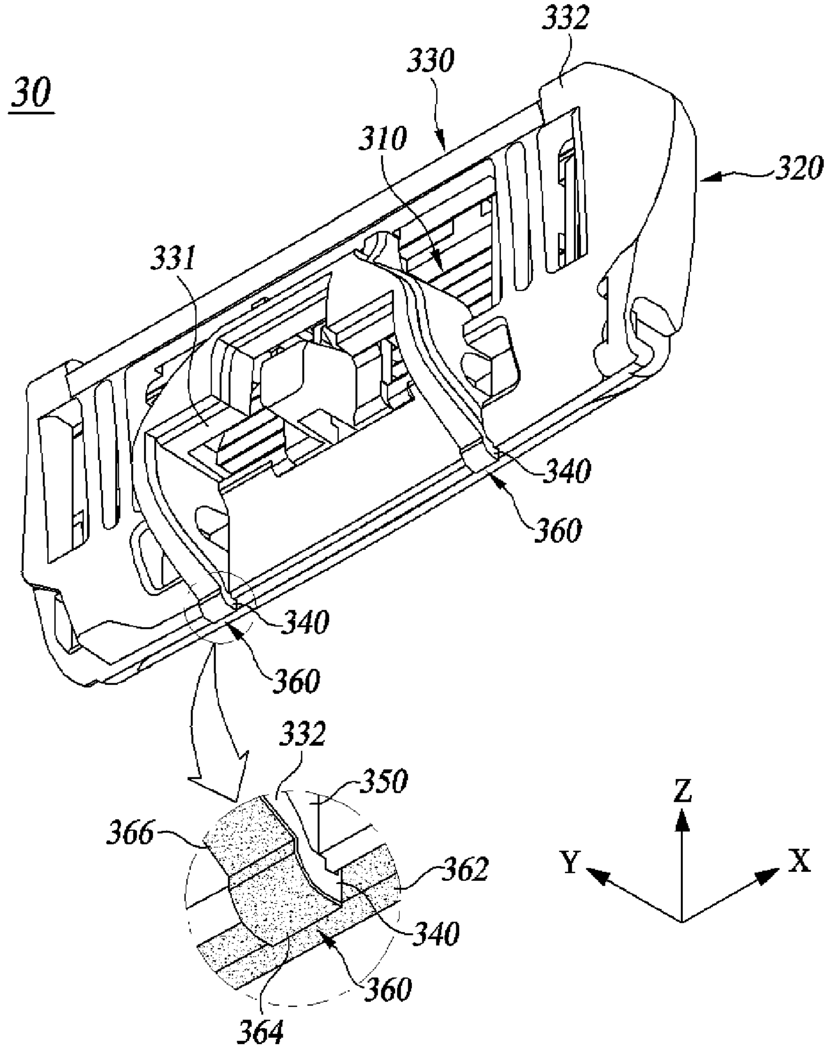
FIG. 7 is a rear perspective view of the razor cartridge according to the third embodiment of the present disclosure.

FIG. 7 is a rear perspective view of the razor cartridge 30 according to the third embodiment of the present disclosure.

Referring to FIGS. 6 and 7, the razor cartridge 30 may include a shaving blade 310, a blade housing 320, a support structure 330, and a first living hinge 340.

The blade housing 320 may accommodate at least one shaving blade 310 having a cutting edge 312 so that the at least one shaving blade 310 is placed in a longitudinal direction.

The blade housing 320 may include a top side 322 and a bottom side 324. The top side 322 may be a side of the blade housing 320 to which the cutting edge 312 is directed. The bottom side 324 may be a side of the blade housing 320 that faces the top side 322.

The blade housing 320 may include a guard portion 326 and a cap portion 32.

The guard portion 326 may be disposed in front of the at least one shaving blade 310 on the top side 322 of the blade housing 320.

The cap portion 32 may be disposed behind the at least one shaving blade 310 on the top side 322 of the blade housing 320.

The support structure 330 according to the third embodiment of the present disclosure may include a connector 331 and a bottom side frame 332.

The connector 331 may be configured to be connected to a razor handle (not illustrated). For example, the connector 331 may be pivotably connected to the razor handle. However, the present disclosure is not limited thereto, and the connector 331 may be connected to the razor handle so that a position of the connector 331 is fixed with respect to the razor handle.

The connector 331 and the bottom side frame 332 may be integrally formed. However, the present disclosure is not limited thereto, and the connector 331 and the bottom side frame 332 may be configured as separate members.

The bottom side frame 332 may be disposed on the bottom side 324 of the blade housing 320, and may be coupled to at least a portion of the bottom side 324.

The at least one first living hinge 340 may connect at least a portion of the blade housing 320 to at least a portion of the support structure 330, for example, at least a portion of the bottom side frame 332.

Accordingly, the at least portion of the blade housing 320, the at least portion of the bottom side frame 332, and the at least one first living hinge 340 may be made of the same material, such as a plastic material.

Furthermore, the at least portion of the blade housing 320, the at least portion of the bottom side frame 332, and the at least one first living hinge 340 may be integrally formed. In this case, the bottom side frame 332 and the first living hinge 340 may be formed by injection in the blade housing 320.

However, the present disclosure is not limited thereto, and the bottom side frame 332 and the first living hinge 340 may be formed through a method other than double injection.

The first living hinge 340 may be disposed adjacent to the guard portion 326. In this case, the first living hinge 340 may connect one end of the blade housing 320 adjacent to the guard portion 326 and one side of the bottom side frame 332 corresponding thereto.

However, the present disclosure is not limited thereto, and the first living hinge 340 may be disposed to be spaced apart from the guard portion 326, or disposed adjacent to both ends of the blade housing 320 in the longitudinal direction.

Optionally, the razor cartridge 30 may include a rubber member 360.

The rubber member 360 may fully or partially cover a connection area between the blade housing 320 and the first living hinge 340, and a connection area between the first living hinge 340 and the bottom side frame 332.

Therefore, there is an effect that the razor cartridge 30 according to the third embodiment of the present disclosure can provide a soft feeling of contact to the user through the rubber member 360 even when the razor cartridge 30 comes into contact with the skin of the user at the time of shaving.

The rubber member 360 may include a first rubber area 362, a second rubber area 364, and a third rubber area 366.

The first rubber area 362 may cover the at least portion of the blade housing 320, and the second rubber area 364 may cover one side of the at least one first living hinge 340. Furthermore, the third rubber area 366 may cover at least a portion of the support structure 330, for example, the at least portion of the bottom side frame 332.

The first rubber area 362, the second rubber area 364, and the third rubber area 366 may be integrally formed. Thus, the connection between the blade housing 320 and the bottom side frame 332 using the first living hinge 340 may be more firmly made.

For example, even when the first living hinge 340 is broken, a connected state between the at least portion of the blade housing 320 and the at least portion of the bottom side frame 332 may be maintained as it is by the rubber member 360.

The rubber member 360 may be formed by double injection on the at least portion of the blade housing 320, the at least portion of the bottom side frame 332, and the at least one first living hinge 340. However, the present disclosure is not limited thereto.

For example, the rubber member 360 may be separately manufactured and then attached to the blade housing 320, the bottom side frame 332, or the first living hinge 340 through an adhesive or the like.

Figure 8:
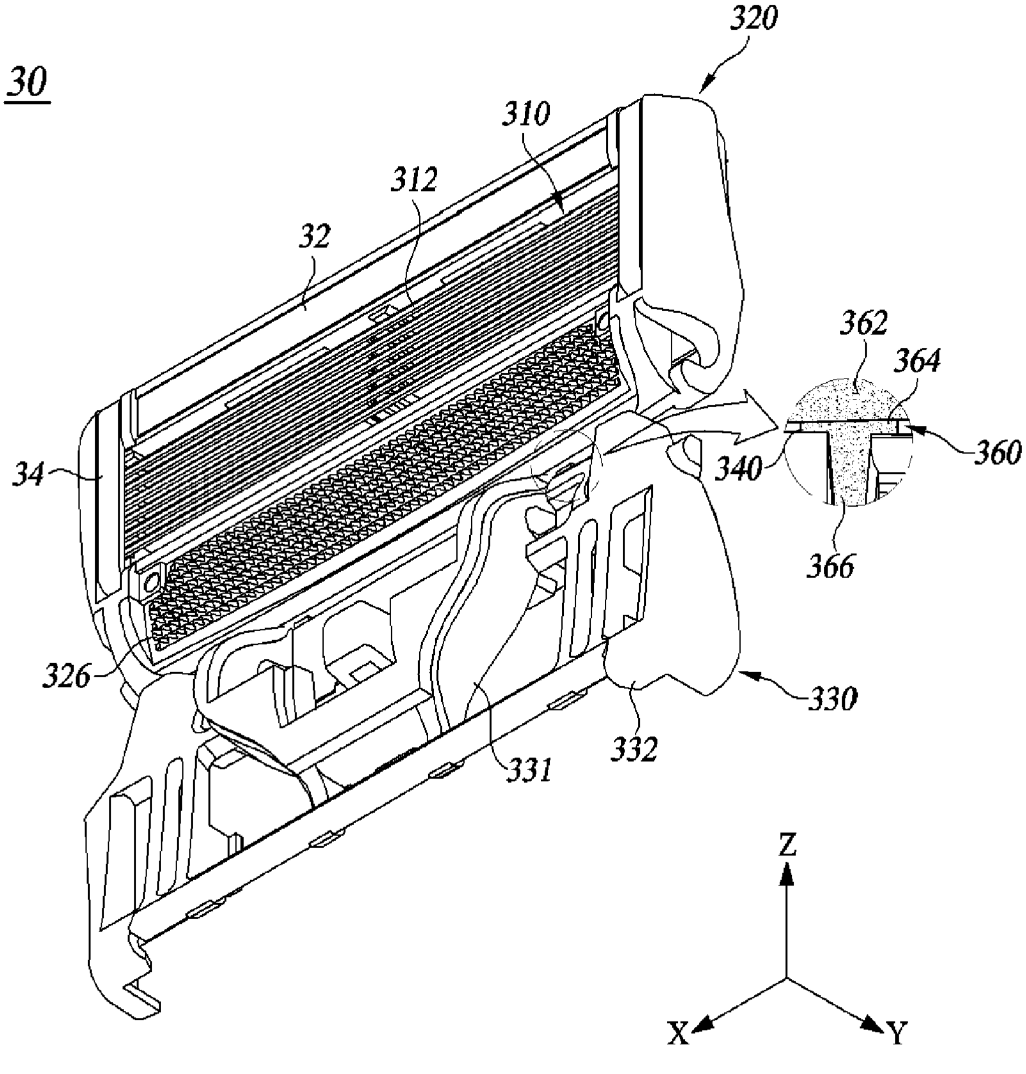
FIGS. 8 and 9 illustrate a deployed state of the razor cartridge according to the third embodiment of the present disclosure.
Figure 9:
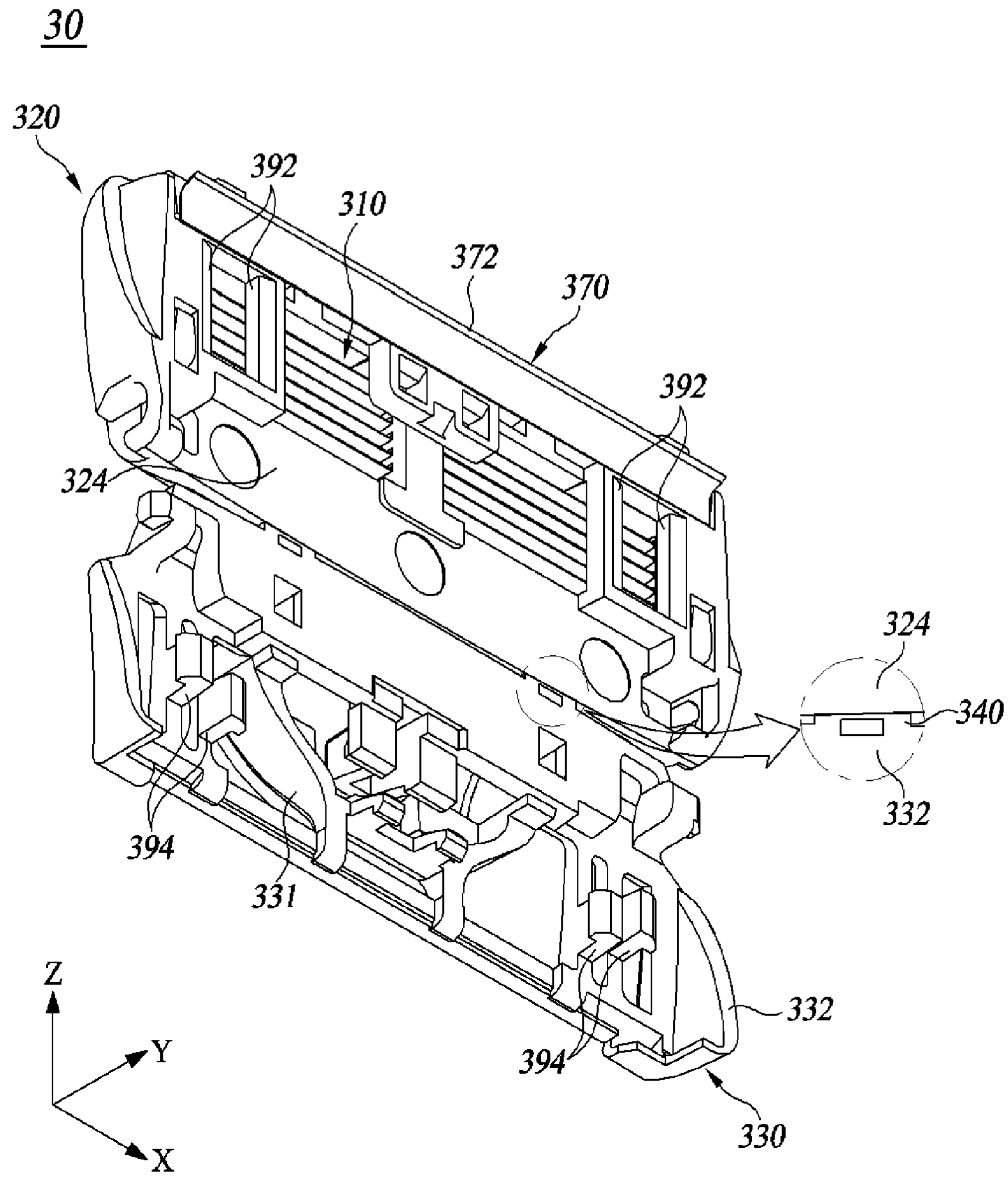

FIGS. 8 and 9 illustrate a deployed state of the razor cartridge 30 according to the third embodiment of the present disclosure.

Specifically, FIG. 8 is a front perspective view illustrating the razor cartridge 30 in a deployed state, and FIG. 9 is a rear perspective view illustrating the razor cartridge 30 in the deployed state.

Referring to FIGS. 8 and 9, the razor cartridge 30 may include a trimming blade 370, protrusions 392, and hooks 394.

The trimming blade 370 may be disposed behind the at least one shaving blade 310 on the bottom side 324 of the blade housing 320.

The trimming blade 370 may include a trimming edge 372. The trimming edge 372 may cut hair of the user at the time of trimming shaving.

A direction in which the trimming edge 372 is directed may be opposite to a direction in which the cutting edge 312 of the shaving blade 310 is directed.

The trimming blade 370 may be supported by the bottom side frame 332 in a state in which the trimming blade 370 is accommodated in the blade housing 320. A detailed description thereof will be described with reference to FIG. 10.

Referring back to FIGS. 8 and 9, the protrusion 392 may be formed on the bottom side 324 of the blade housing 320, and the hook 394 may be formed in the support structure 330, for example, the bottom side frame 332.

The protrusion 392 and the hook 394 may be hook coupled so that the blade housing 320 and the bottom side frame 332 may be connected to each other.

Specifically, the one side of the bottom side frame 332 may be connected to the blade housing 320 by the first living hinge 340, and the other side of the bottom side frame 332 may be connected to the blade housing 320 through the hook coupling between the hook 394 and the protrusion 392.

In this case, the one side of the bottom side frame 332 may be an area of the bottom side frame 332 adjacent to the one end of the blade housing 320 adjacent to the guard portion 326, and the other side of the bottom side frame 332 may be an area of the bottom side frame 332 spaced apart from the one end of the blade housing 320.

Thus, the blade housing 320 and the support structure 330, for example, the bottom side frame 332, may be connected at a position spaced apart from the at least one first living hinge 340 through the hook coupling between the protrusion 392 and the hook 394.

The bottom side frame 332 may be connected to the blade housing 320 through hook coupling between the hook 394 and the protrusion 392 in addition to the connection using the first living hinge 340. This makes it possible for the bottom side frame 332 and the connector 331 disposed on the bottom side frame 332 to be more firmly coupled to the blade housing 320.

The protrusion 392 is formed in the blade housing 320 and the hook 394 is formed in the support structure 330 as illustrated in FIGS. 8 and 9, but the present disclosure is not limited thereto. For example, the protrusion 392 may be formed in the support structure 330 and the hook 394 may be formed in the blade housing 320.

FIG. 10 illustrates a process in which the razor cartridge 30 according to the third embodiment of the present disclosure is assembled.

Figure 10A:
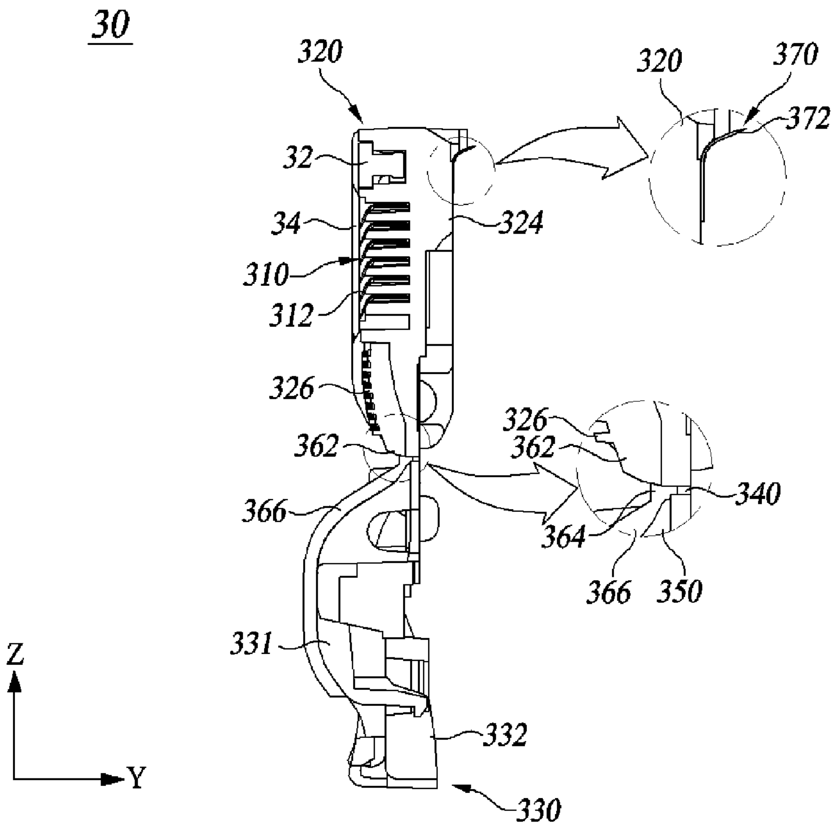
FIG. 10 is a view illustrating a process in which the razor cartridge according to the third embodiment of the present disclosure is assembled.
Figure 10B:
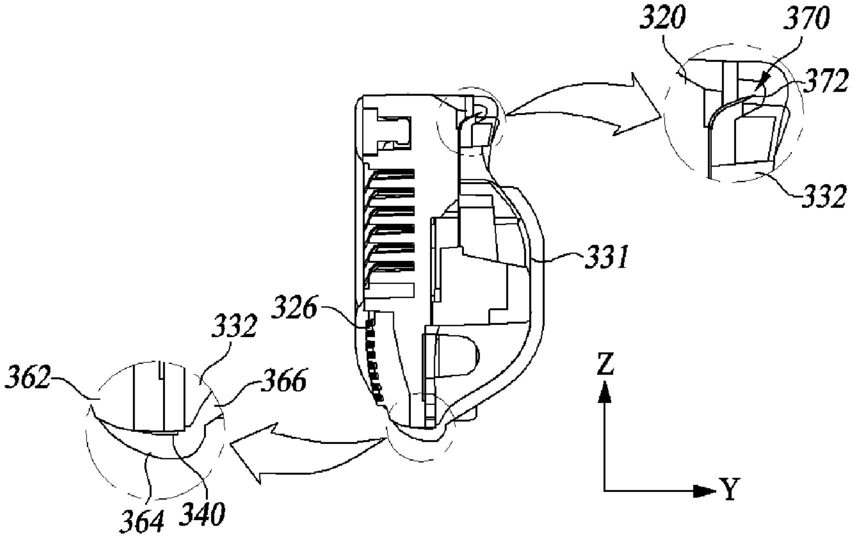

Specifically, FIG. 10A illustrates a side cross-sectional view of the razor cartridge 30 before assembly, and FIG. 10B illustrates a side cross-sectional view of the razor cartridge 30 after assembly.

Referring to FIG. 10A, the hook coupling between the protrusion 392 and the hook 394 may be in a released state in the non-assembled state. Accordingly, the other side of the bottom side frame 332 in which the hook 394 is formed may be in a state separated from the blade housing 320.

Meanwhile, the at least portion of the blade housing 320 and the at least portion of the bottom side frame 332 may be connected by at least one first living hinge 340.

Meanwhile, the trimming blade 370 may be accommodated on the blade housing 320 in the non-assembled state.

Referring to FIG. 10B, in the assembled state, the bottom side frame 332 may move toward the bottom side 324 of the blade housing 320 by the first living hinge 340 being folded.

In this case, the hook coupling may be made between the protrusion 392 and the hook 394, and the other side of the bottom side frame 332 in which the hook 394 is formed may be connected to the blade housing 320.

Meanwhile, in the assembled state, the trimming blade 370 may be supported between the blade housing 320 and the support structure 330, for example between the blade housing 320 and the bottom side frame 332. Specifically, one side of the trimming blade 370 may be supported by the blade housing 320, and the other side of the trimming blade 370 may be supported by the bottom side frame 332.

Thus, the razor cartridge 30 according to the third embodiment of the present disclosure has an effect that the trimming blade 370 may be supported to the blade housing 320 without a separate member for fixing the trimming blade 370.

A case in which the trimming blade 370 is supported to the blade housing 320 by the bottom side frame 332 is illustrated in FIGS. 10A and B, but the present disclosure is not limited thereto.

For example, the trimming blade 370 may be supported to the blade housing 320 by a separate support member or may be directly welded to the blade housing 320.

A fourth embodiment of the present disclosure illustrated in FIGS. 11 to 13, which will be described below, differs from the third embodiment of the present disclosure illustrated in FIGS. 6 to 10 in that the connector and the bottom side frame are connected through a second living hinge. Hereinafter, repeated description of components substantially the same as those described above will be omitted.

Figure 11:
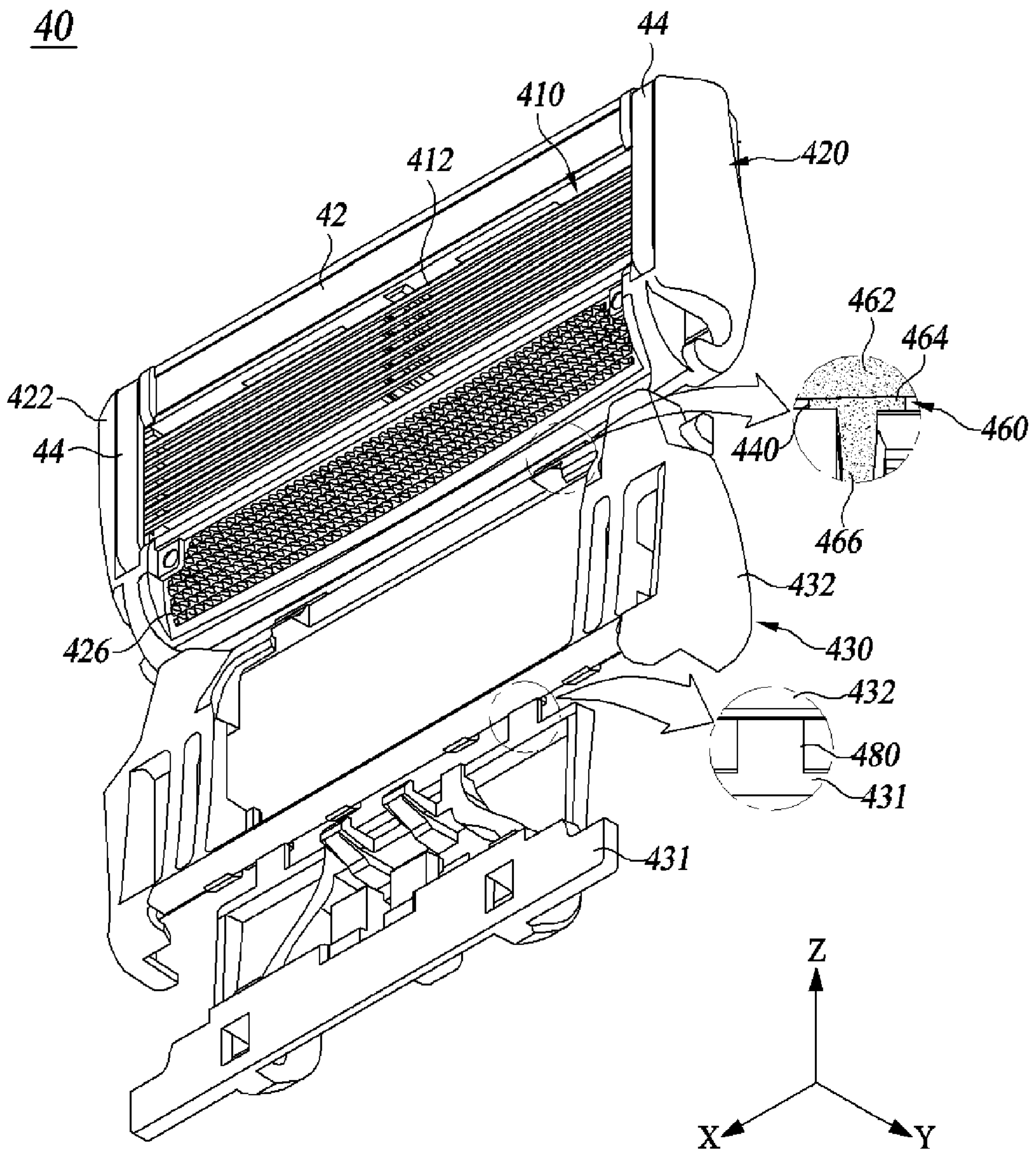
FIGS. 11 and 12 illustrate a deployed state of a razor cartridge according to a fourth embodiment of the present disclosure.
Figure 12:
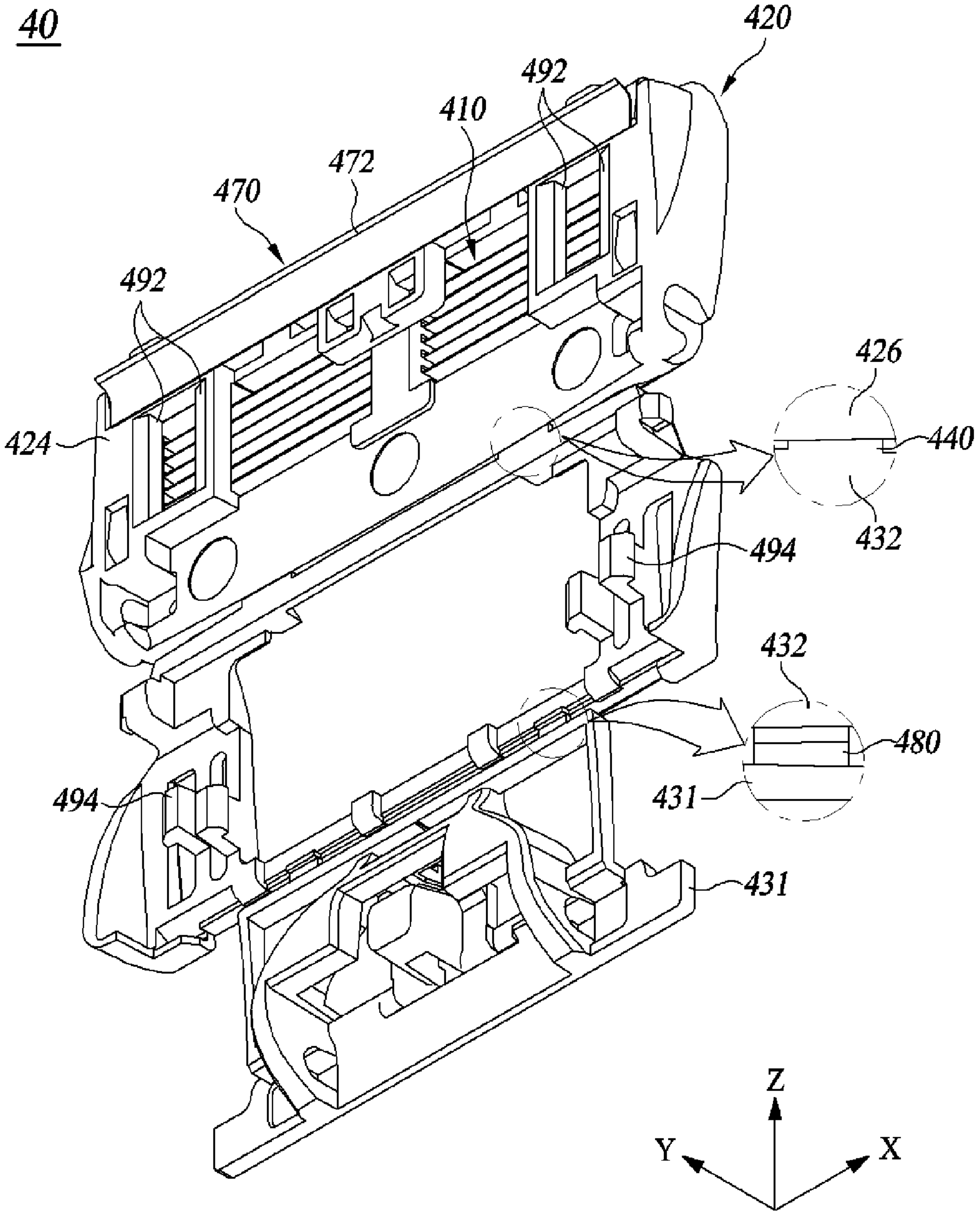

FIGS. 11 and 12 illustrate a deployed state of the razor cartridge 40 according to the fourth embodiment of the present disclosure.

Referring to FIGS. 11 and 12, the razor cartridge 40 may include a shaving blade 410, a blade housing 420, a support structure 430, a first living hinge 440, a trimming blade 470, and a second living hinge 480.

The blade housing 420 may accommodate at least one shaving blade 410 having a cutting edge 412 so that the at least one shaving blade 410 is placed in a longitudinal direction.

The blade housing 420 may include a top side 422 and a bottom side 424. The top side 422 may be a side of the blade housing 420 to which the cutting edge 412 is directed. The bottom side 424 may be a side of the blade housing 420 that faces the top side 422.

The blade housing 420 may include a guard portion 426 and a cap portion 42.

The guard portion 426 may be disposed in front of the at least one shaving blade 410 on the top side 422 of the blade housing 420.

The cap portion 42 may be disposed behind the at least one shaving blade 410 on the top side 422 of the blade housing 420.

The support structure 430 according to the fourth embodiment of the present disclosure may include a connector 431 and a bottom side frame 432.

The connector 431 may be configured to be connected to a razor handle (not illustrated).

For example, the connector 431 may be pivotably connected to the razor handle. However, the present disclosure is not limited thereto, and the connector 431 may be connected to the razor handle so that a position of the connector 431 is fixed with respect to the razor handle.

The bottom side frame 432 may be disposed on the bottom side 424 of the blade housing 420 and coupled to at least a portion of the bottom side 424.

At least one first living hinge 440 may connect at least a portion of the blade housing 420 to at least a portion of the bottom side frame 432.

The at least portion of the blade housing 420, the at least portion of the bottom side frame 432, and the at least one first living hinge 440 may be made of the same material, such as a plastic material.

Furthermore, the at least portion of the blade housing 420, the at least portion of the bottom side frame 432, and the at least one first living hinge 440 may be integrally formed.

The first living hinge 440 may be disposed adjacent to the guard portion 426. In this case, the first living hinge 440 may connect one end of the blade housing 420 adjacent to the guard portion 426 and one side of the bottom side frame 432 corresponding thereto.

However, the present disclosure is not limited thereto, and the first living hinge 440 may be disposed to be spaced apart from the guard portion 426, or disposed adjacent to both ends of the blade housing 420 in the longitudinal direction.

The at least one second living hinge 480 may connect at least another portion of the bottom side frame 432 to at least a portion of the connector 431.

The at least other portion of the bottom side frame 432, the at least portion of the connector 431, and the at least one second living hinge 480 may be made of the same material, such as a plastic material.

Furthermore, the at least other portion of the bottom side frame 432, the at least portion of the connector 431, and the at least one second living hinge 480 may be integrally formed.

Optionally, the razor cartridge 40 may include a rubber member 460.

The rubber member 460 may at least partially cover a connection area between the blade housing 420 and the first living hinge 440, and a connection area between the first living hinge 440 and the bottom side frame 432.

The rubber member 460 may include a first rubber area 462, a second rubber area 464, and a third rubber area 466.

The first rubber area 462 may cover the at least portion of the blade housing 420, and the second rubber area 464 may cover one side of the at least one first living hinge 440. Furthermore, the third rubber area 466 may cover at least a portion of the support structure 430, for example, the at least portion of the bottom side frame 432.

The first rubber area 462, the second rubber area 464, and the third rubber area 466 may be integrally formed. Thus, the connection between the blade housing 420 and the bottom side frame 432 using the first living hinge 440 may be more firmly made.

The rubber member 460 may be formed by double injection on the at least portion of the blade housing 420, the at least portion of the bottom side frame 432, and the at least one first living hinge 440. However, the present disclosure is not limited thereto.

The trimming blade 470 may be disposed behind the at least one shaving blade 410 on the bottom side 424 of the blade housing 420.

The trimming blade 470 may include a trimming edge 472. The trimming edge 472 may cut hair of the user at the time of trimming shaving.

A direction in which the trimming edge 472 is directed may be opposite to a direction in which the cutting edge 412 of the shaving blade 410 is directed.

The trimming blade 470 may be supported by the bottom side frame 432 in a state in which the trimming blade 470 is accommodated in the blade housing 420.

The razor cartridge 40 may additionally include protrusions 492 and hooks 494.

The protrusions 492 may be formed on the bottom side 424 of the blade housing 420, and the hooks 494 may be formed in the support structure 430, for example, the bottom side frame 432.

The protrusions 492 and the hooks 494 may be hook coupled so that the blade housing 420 and the bottom side frame 432 may be connected to each other.

Specifically, one side of the bottom side frame 432 may be connected to the blade housing 420 by the first living hinge 440, and the other side of the bottom side frame 432 may be connected to the blade housing 420 through hook coupling between the hook 494 and the protrusion 492.

In this case, the one side of the bottom side frame 432 may be an area of the bottom side frame 432 adjacent to the one end of the blade housing 420 adjacent to the guard portion 426, and the other side of the bottom side frame 432 may be an area of the bottom side frame 432 spaced apart from the one end of the blade housing 420.

Thus, the blade housing 420 and the support structure 430, for example, the bottom side frame 432 may be connected at a position spaced apart from the at least one first living hinge 440 through the hook coupling between the protrusion 492 and the hook 494.

The protrusion 492 is formed in the blade housing 420 and the hook 494 is formed in the support structure 430 as illustrated in FIGS. 11 and 12, but the present disclosure is not limited thereto. For example, the protrusion 492 may be formed in the support structure 430 and the hook 494 may be formed in the blade housing 420.

FIG. 13 illustrates a process in which the razor cartridge 40 according to the fourth embodiment of the present disclosure is assembled.

Figure 13A:
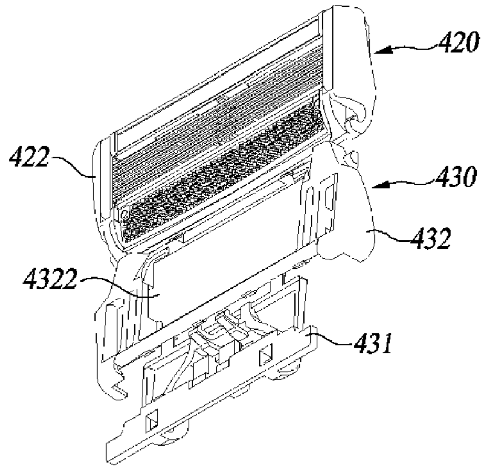
FIG. 13 is a view illustrating a process in which the razor cartridge according to the fourth embodiment of the present disclosure is assembled.
Figure 13B:
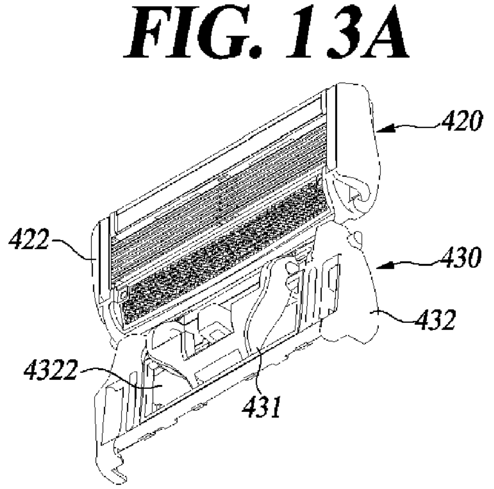
Figure 13C:
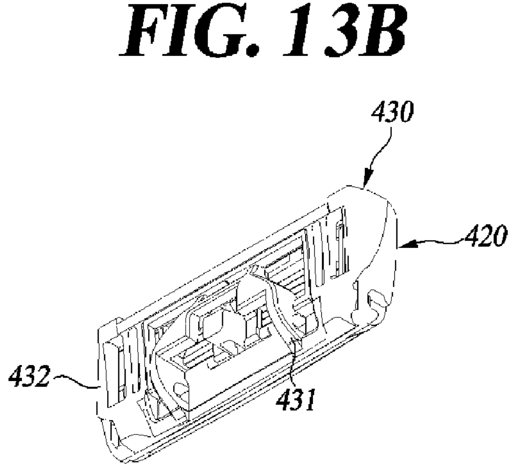

Specifically, FIG. 13A illustrates a side cross-sectional view of the razor cartridge 40 before assembly, FIG. 13B illustrates a side cross-sectional view of the razor cartridge 40 after the connector 431 is assembled with the bottom side frame 432, and FIG. 13C is a side cross-sectional view of the razor cartridge 40 after the bottom side frame 432 is assembled with the blade housing 420.

Referring to FIG. 13A, the at least other portion of the bottom side frame 432 and the at least portion of the connector 431 may be connected by the at least one second living hinge 480 in a state before the connector 431 is assembled with the bottom side frame 432.

Referring to FIG. 13B, in a process in which the connector 431 is assembled with the bottom side frame 432, the connector 431 can be safely placed in an accommodation hole 4322 of the bottom side frame 432 by the second living hinge 480 being folded.

Referring to FIG. 13C, in a state in which the bottom side frame 432 has been assembled to the connector 431, the bottom side frame 432 may move toward the bottom side 424 of the blade housing 420 by the first living hinge 440 being folded.

In this case, the hook coupling may be made between the protrusion 492 and the hook 494, and the other side of the bottom side frame 432 in which the hook 494 is formed may be connected to the blade housing 420.

Hereinafter, repeated description of components substantially the same as those described above will be omitted.

Figure 14:
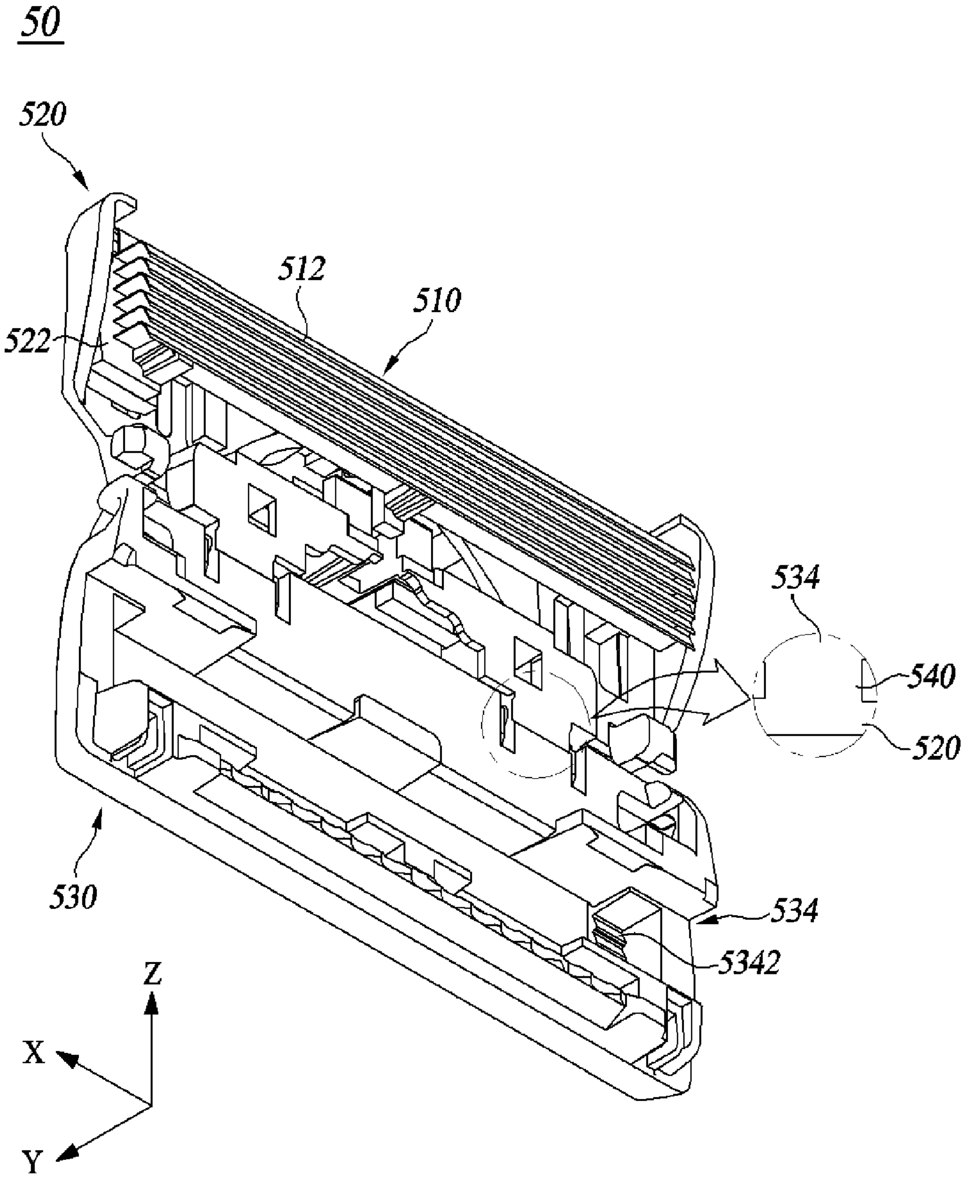
FIGS. 14 and 15 illustrate a deployed state of a razor cartridge according to a fifth embodiment of the present disclosure.
Figure 15:
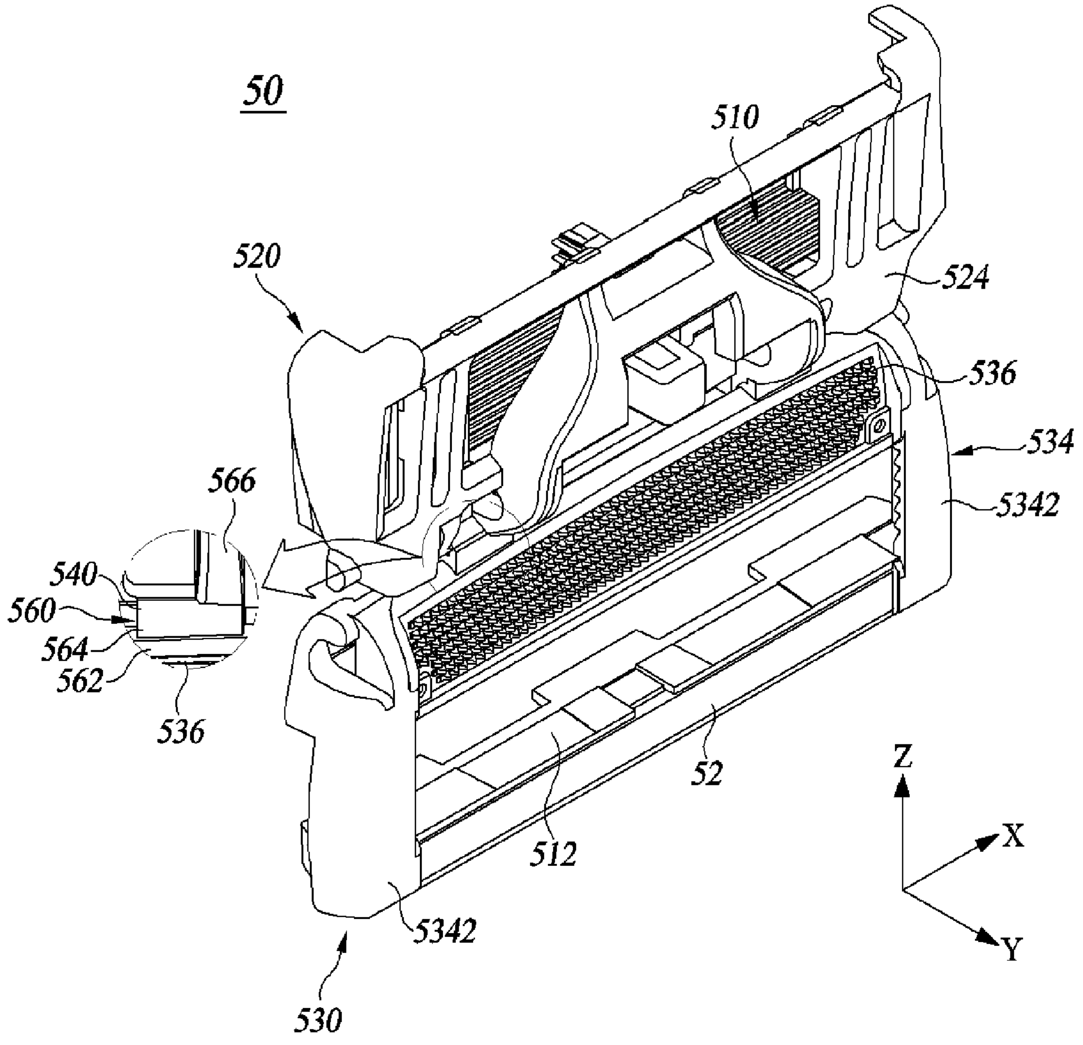

FIGS. 14 and 15 illustrate a deployed state of a razor cartridge 50 according to a fifth embodiment of the present disclosure.

Specifically, FIG. 14 is a front perspective view illustrating the razor cartridge 50 in the deployed state, and FIG. 15 is a rear perspective view illustrating the razor cartridge 50 in the deployed state.

Referring to FIGS. 14 and 15, the razor cartridge 50 may include a shaving blade 510, a blade housing 520, a support structure 530, at least one first living hinge 540, and a trimming blade (570 in FIG. 16).

The blade housing 520 may accommodate at least one shaving blade 510 having a cutting edge 512 so that the at least one shaving blade 510 is placed in a longitudinal direction.

The blade housing 520 may include a top side 522 and a bottom side 524. The top side 522 may be a side of the blade housing 520 to which the cutting edge 512 is directed. The bottom side 524 may be a side of the blade housing 520 that faces the top side 522.

The support structure 530 may be coupled to one side of the blade housing 520. For example, the support structure 530 may be coupled to the top side 522 and the bottom side 524 of the blade housing 520.

The support structure 530 according to the fifth embodiment of the present disclosure may include a top side frame 534.

The top side frame 534 may be disposed on the top side 522 of the blade housing 520 and may be coupled to at least a portion of the top side 522.

The top side frame 534 may include a guard portion 536, a cap portion 52, and two retaining portions 5342.

In a state in which the top side frame 534 is fully assembled to the blade housing 520, the guard portion 536 may be disposed in front of the at least one shaving blade 510, and the cap portion 52 may be disposed behind the at least one shaving blade 510.

The two retaining portions 5342 may be disposed on both sides of the top side frame 534 in the longitudinal direction.

The two retaining portions 5342 may retain the at least one shaving blade 510 to the blade housing 520 in a state in which the top side frame 534 is fully assembled to the blade housing 520.

Thus, the razor cartridge 50 according to the fifth embodiment of the present disclosure has an effect that the shaving blade 510 can be retained to the blade housing 520 without a separate retaining member such as a clip.

The at least one first living hinge 540 may connect at least a portion of the blade housing 520 to at least a portion of the top side frame 534.

The at least a portion of the blade housing 520, the at least portion of the top side frame 534, and the at least one first living hinge 540 may be made of the same material, such as a plastic material.

Furthermore, the at least portion of the blade housing 520, the at least portion of the top side frame 534, and the at least one first living hinge 540 may be integrally formed.

The first living hinge 540 may be disposed adjacent to the guard portion 536. In this case, the first living hinge 540 may connect one side of the top side frame 534 adjacent to the guard portion 536 and one end of the blade housing 520 corresponding thereto.

A rubber member 560 may at least partially cover a connection area between the blade housing 520 and the first living hinge 540, and a connection area between the first living hinge 540 and the top side frame 534.

The rubber member 560 may include a first rubber area 562, a second rubber area 564, and a third rubber area 566.

The first rubber area 562 may cover the at least portion of the blade housing 520, and the second rubber area 564 may cover one side of the at least one first living hinge 540. Furthermore, the third rubber area 566 may cover at least a portion of the support structure 530, for example, the at least portion of the top side frame 534.

The first rubber area 562, the second rubber area 564, and the third rubber area 566 may be integrally formed. Thus, the connection between the blade housing 520 and the top side frame 534 using the first living hinge 540 may be more firmly made.

The rubber member 560 may be formed by double injection on the at least portion of the blade housing 520, the at least portion of the top side frame 534, and the at least one first living hinge 540. However, the present disclosure is not limited thereto.

The trimming blade 570 in FIG. 16 may be disposed behind the at least one shaving blade 510 on the bottom side 524 of the blade housing 520.

The trimming blade 570 may include a trimming edge 572. The trimming edge 572 may cut hair of the user at the time of trimming shaving.

A direction in which the trimming edge 572 is directed may be opposite to a direction in which the cutting edge 512 of the shaving blade 510 is directed.

The trimming blade 570 may be supported by the top side frame 534 in a state in which the trimming blade 570 is accommodated in the blade housing 520. A detailed description thereof will be described with reference to FIG. 16.

Referring back to FIGS. 14 and 15, the razor cartridge 50 may additionally include protrusions (not illustrated) and hooks (not illustrated).

The protrusion may be formed in the support structure 530, for example, the top side frame 534, and the hook may be formed in the top side 522 of the blade housing 520.

The protrusion and the hook may be hook coupled so that the blade housing 520 and the top side frame 534 may be connected to each other.

Specifically, the one side of the top side frame 534 may be connected to the blade housing 520 by the first living hinge 540, and the other side of the top side frame 534 may be connected to the blade housing 520 through the hook coupling between the hook and the protrusion.

In this case, the one side of the top side frame 534 may be an area of the top side frame 534 adjacent to the guard portion 536, and the other side of the top side frame 534 may be an area of the top side frame 534 spaced apart from to the guard portion 536.

Thus, the blade housing 520 and the support structure 530, for example, the top side frame 534, may be connected at a position spaced apart from the at least one first living hinge 540 through the hook coupling between the protrusion and the hook.

FIG. 16 illustrates a process in which the razor cartridge 50 according to the fifth embodiment of the present disclosure is assembled.

Specifically, FIG. 16 A illustrates a side cross-sectional view of the razor cartridge 50 before assembly, and FIG. 16 B illustrates a side cross-sectional view of the razor cartridge 50 after assembly.

Figure 16A:
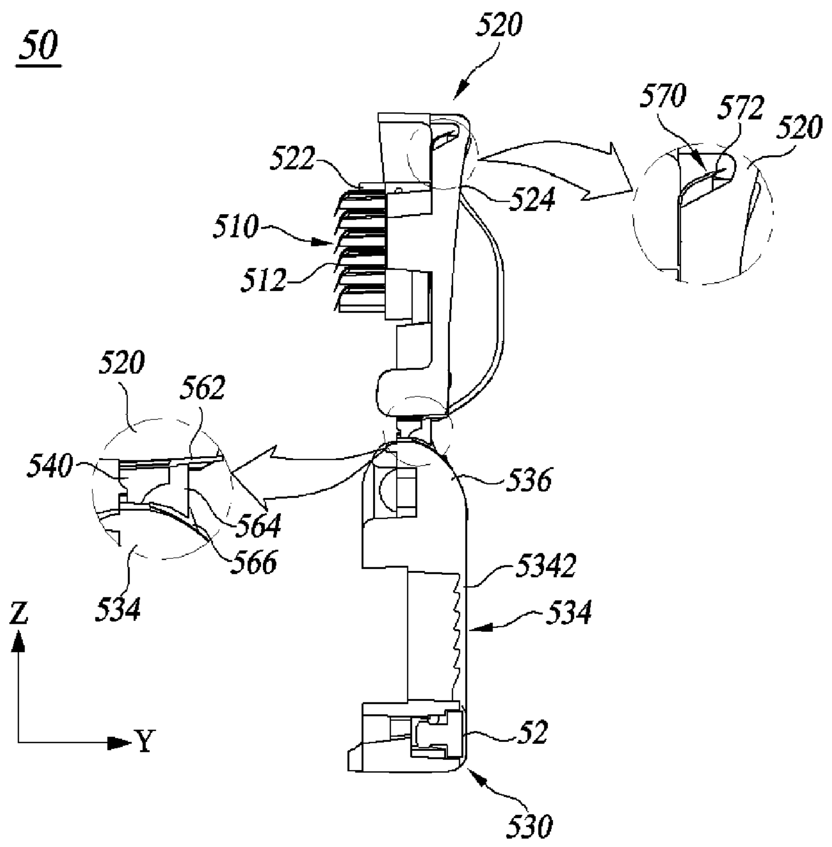
FIG. 16 is a view illustrating a process in which the razor cartridge according to the fifth embodiment of the present disclosure is assembled.

Referring to FIG. 16A, the hook coupling between the protrusion and the hook may be in a released state in the non-assembled state. Accordingly, the other side of the top side frame 534 in which the protrusion is formed may be in a state separated from the blade housing 520.

Meanwhile, the at least portion of the blade housing 520 and the at least portion of the top side frame 534 may be connected by the at least one first living hinge 540 in the non-assembled state.

Meanwhile, the trimming blade 570 may be accommodated on the blade housing 520 in the non-assembled state.

Figure 16B:
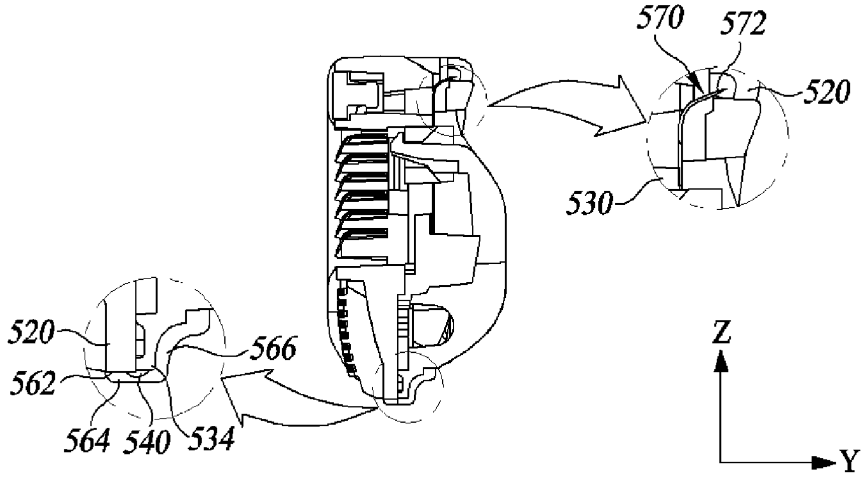

Referring to FIG. 16B, in the assembled state, the top side frame 534 may move towards the top side 522 of the blade housing 520 by the first living hinge 540 being folded.

In this case, the hook coupling may be made between the protrusion and the hook, and the other side of the top side frame 534 in which the protrusion is formed may be connected to the blade housing 520.

Meanwhile, in the assembled state, the trimming blade 570 accommodated in the blade housing 520 may be supported by the top side frame 534. Specifically, one side of the trimming blade 570 may be supported by the blade housing 520, and the other side of the trimming blade 570 may be supported by the top side frame 534.

Thus, the razor cartridge 50 according to the fifth embodiment of the present disclosure has an effect that the trimming blade 570 can be supported to the blade housing 520 without a separate member for fixing the trimming blade 570.

A case in which the trimming blade 570 is supported to the blade housing 520 by the top side frame 534 is illustrated in FIGS. 16A and B, but the present disclosure is not limited thereto.

For example, the trimming blade 570 may be supported to the blade housing 520 by a separate support member or may be directly welded to the blade housing 520.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A razor cartridge configured to be coupled to a razor handle and used, the razor cartridge comprising:
- at least one shaving blade having a cutting edge;
- a blade housing configured to accommodate the at least one shaving blade so that the at least one shaving blade is placed in a longitudinal direction, the blade housing including a top side to which the cutting edge is directed and a bottom side facing the top side;
- a support structure coupled to one side of the blade housing; and
- at least one first living hinge configured to connect at least a portion of the blade housing to at least a portion of the support structure,
- wherein the support structure is coupled to the top side or the bottom side of the blade housing by the at least one first living hinge, and
- wherein when the razor cartridge pivots with respect to the razor handle, the blade housing and the support structure are fixed with respect to each other and do not pivot with respect to each other.

2. The razor cartridge of claim 1, wherein the at least a portion of the blade housing, the at least a portion of the support structure, and the at least one first living hinge are integrally formed.

3. The razor cartridge of claim 2, wherein the at least a portion of the blade housing, the at least a portion of the support structure, and the at least one first living hinge are made of a plastic material.

4. The razor cartridge of claim 2, further comprising:

a rubber member including a first rubber area covering the at least a portion of the blade housing and a second rubber area covering one side of the at least one first living hinge, and wherein the first rubber area and the second rubber area are integrally formed.

5. The razor cartridge of claim 4, wherein the rubber member further includes a third rubber area covering the at least a portion of the support structure, and wherein the first rubber area, the second rubber area, and the third rubber area are integrally formed.

6. The razor cartridge according to claim 4, wherein the rubber member is configured to be formed by double injection on the at least a portion of the blade housing, the at least the portion of the support structure, and the at least one first living hinge.

7. The razor cartridge of claim 2, wherein the support structure includes:

a bottom side frame disposed on the bottom side of the blade housing; and a connector configured to be connected to the razor handle, and wherein the at least one first living hinge connects the at least a portion of the blade housing to at least a portion of the bottom side frame.

8. The razor cartridge of claim 7, wherein the connector and the bottom side frame are integrally formed.

9. The razor cartridge of claim 1, further comprising:

at least one second living hinge, wherein the support structure includes a bottom side frame disposed on the bottom side of the blade housing, and a connector configured to be connected to the razor handle, and wherein the at least one second living hinge connects at least a portion of the bottom side frame to at least a portion of the connector.

10. The razor cartridge of claim 1, further comprising:

a trimming blade disposed behind the at least one shaving blade, wherein the support structure includes a bottom side frame disposed on the bottom side of the blade housing, and wherein the trimming blade is supported between the blade housing and the support structure.

11. The razor cartridge of claim 1, further comprising:

a protrusion formed in one of the blade housing and the support structure; and a hook formed in the other one of the blade housing and the support structure, wherein the blade housing and the support structure are connected at a position spaced apart from the at least one first living hinge through hook coupling between the protrusion and the hook.

12. The razor cartridge of claim 1, wherein the blade housing includes a guard portion disposed in front of the at least one shaving blade, and wherein the at least one first living hinge is disposed adjacent to the guard portion.

13. The razor cartridge of claim 1, wherein the support structure includes a top side frame disposed on the top side of the blade housing, and wherein the at least one first living hinge connects the at least a portion of the blade housing to at least a portion of the top side frame.

14. The razor cartridge of claim 13, wherein the top side frame includes a guard portion disposed in front of the at least one shaving blade, and wherein the at least one first living hinge is disposed adjacent to the guard portion.

15. The razor cartridge of claim 1, wherein the support structure includes a connector configured to connect to the razor handle, and wherein the at least one first living hinge connects the at least a portion of the blade housing to at least a portion of the connector.

* * * * *